(12) United States Patent
Zeng et al.

(10) Patent No.: US 9,930,323 B2
(45) Date of Patent: Mar. 27, 2018

(54) METHOD OF MISALIGNMENT CORRECTION AND DIAGNOSTIC FUNCTION FOR LANE SENSING SENSOR

(71) Applicant: GM GLOBAL TECHNOLOGY OPERATIONS LLC, Detroit, MI (US)

(72) Inventors: Shuqing Zeng, Sterling Heights, MI (US); Xiaofeng F. Song, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 450 days.

(21) Appl. No.: 14/259,470

(22) Filed: Apr. 23, 2014

(65) Prior Publication Data

US 2015/0312564 A1    Oct. 29, 2015

(51) Int. Cl.
| | |
|---|---|
| H04N 17/00 | (2006.01) |
| H04N 17/02 | (2006.01) |
| G06T 7/00 | (2017.01) |
| G06T 7/80 | (2017.01) |
| G06K 9/32 | (2006.01) |
| G06K 9/00 | (2006.01) |

(52) U.S. Cl.
CPC .......... *H04N 17/002* (2013.01); *G06K 9/32* (2013.01); *G06T 7/0002* (2013.01); *G06T 7/80* (2017.01); *G06K 9/00798* (2013.01); *G06T 2207/20076* (2013.01); *G06T 2207/30168* (2013.01); *G06T 2207/30256* (2013.01)

(58) Field of Classification Search
CPC .............................. H04N 9/097; H04N 17/002
USPC ................ 348/175, 149, E7.085; 701/29, 41
See application file for complete search history.

(56) References Cited

U.S. PATENT DOCUMENTS

| | | | |
|---|---|---|---|
| 2006/0184297 A1* | 8/2006 | Higgins-Luthman | ..... B60R 1/00 701/41 |
| 2014/0063251 A1* | 3/2014 | Kim | ....................... G08G 1/167 348/148 |

* cited by examiner

*Primary Examiner* — Jefferey F Harold
*Assistant Examiner* — Omer Khalid
(74) *Attorney, Agent, or Firm* — Quinn IP Law

(57) ABSTRACT

A method of diagnosing a state of health of a vision-based lane sensing system. A first misalignment factor is calculated as a function of a vehicle lateral offset and a vehicle heading. A second misalignment factor is calculated as a function of a vehicle speed, an estimated curvature of an expected path of travel, a lane curvature, and the vehicle heading. Histograms are generated for the first and second misalignment factors. A probability of a state of health is determined. A determination is made whether the probability of the state of health is within a predetermined threshold. An angle misalignment of the vision system is estimated. The angle misalignment of the vision system is corrected in response to the determination that the probability of the state of health is within the predetermined threshold; otherwise a warning of a faulty lane sensing system is actuated.

14 Claims, 6 Drawing Sheets

METHOD OF MISALIGNMENT CORRECTION AND DIAGNOSTIC FUNCTION FOR LANE SENSING SENSOR

BACKGROUND OF INVENTION

An embodiment relates to lane sensing calibration for vision sensors of a lane sensing system.

A lane departure warning system and lane centering system are a couple examples of vehicle systems designed to either warn a driver when the vehicle begins to unintentionally move out of its lane or maintain a vehicle in its lane. Visions systems are one of the devices typically used for sensing the lane of the road of travel. Vision sensors require proper alignment; otherwise, results from the lane sensing system may be skewed. For example, a forward facing image capture device captures a scene exterior of the vehicle in a forward direction. Typically the forward facing capture device would be aligned with a centerline of the vehicle if mounted on the centerline of the vehicle. Any angle misalignment in the vision image device would result inaccurate positioning of the vehicle in the lane which would ultimately hinder the vehicle from properly detecting departure of a lane of an attempt to maintain a vehicle in a center of the lane.

Systems exist where a vehicle vision capture device is manually corrected by bringing the vehicle into a service station where a service personnel determines whether an angle misalignment is present and the service personnel corrects the misalignment manually. What would be beneficial is to have an automated system that autonomously detects a misalignment and can autonomously correct a misalignment.

SUMMARY OF INVENTION

An advantage of an embodiment is an autonomous detection of a misalignment of the image capture device in a lane sensing system and autonomous correction of an angle misalignment. The system utilizes parameters with respect to the vehicle and the road, such as the vehicle yaw rate, vehicle lateral offset, vehicle heading, vehicle speed, lane curvature, and an estimated curvature of an expected path of travel for detecting angle misalignment. Based on determined probabilities, an angle misalignment is determined and the angle misalignment is autonomously corrected if the misalignment is with a respective tolerance. If the misalignment outside of a respective tolerance, then warning is actuated for having the lane sensing system serviced.

An embodiment contemplates a method of diagnosing a state of health of a vision-based lane sensing system for a vehicle. A first misalignment factor is calculated as a function of a vehicle lateral offset and a vehicle heading. A second misalignment factor is calculated as a function of a vehicle speed, an estimated curvature of an expected path of travel of the vehicle, a lane curvature of a traveled road, and the vehicle heading. A histogram is generated for the first misalignment factor and a histogram for the second misalignment factor. A probability of a state of health is determined based on the histogram of first misalignment factor and the histogram of the second misalignment factor. A determination is made whether the probability of the state of health is within a predetermined threshold. An angle misalignment of the vision system is estimated. The angle misalignment of the vision system is corrected in response to the determination that the probability of the state of health is within the predetermined threshold; otherwise a warning of a faulty lane sensing system is actuated.

DETAILED DESCRIPTION

Figure 1:
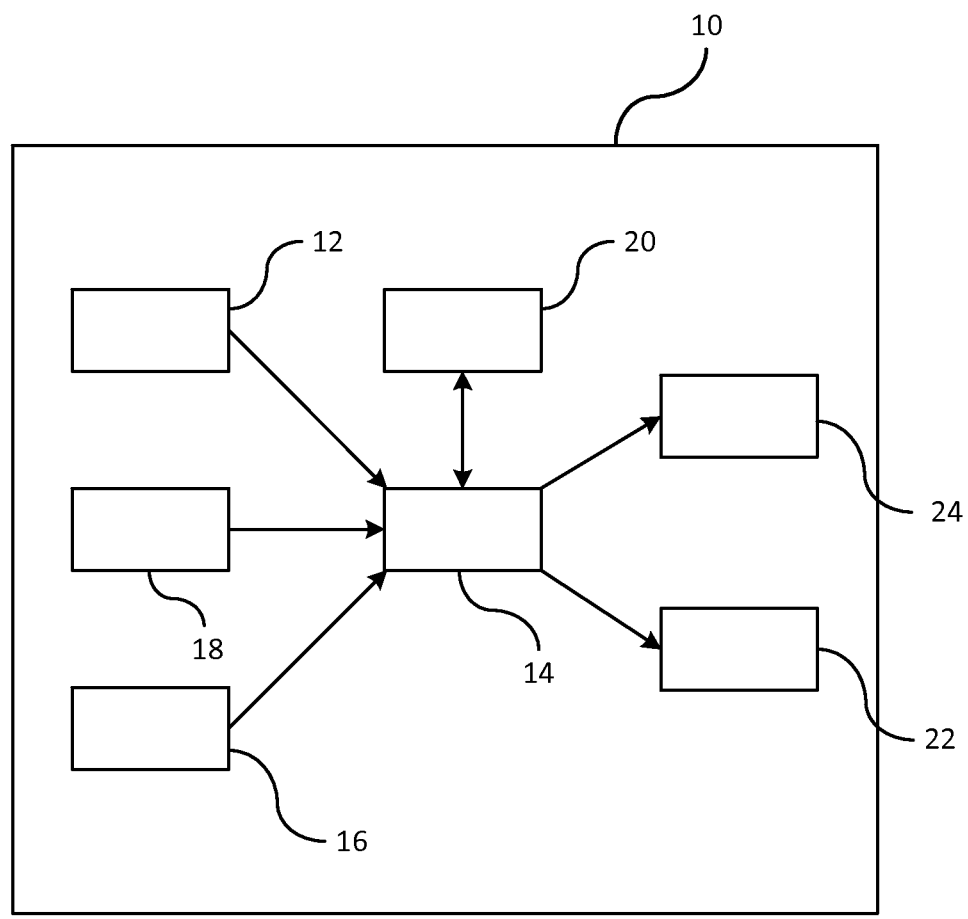
FIG. 1 is a block diagram of a vision angle misalignment system.

There is shown in FIG. 1 a vision angle misalignment system 10 for detecting a state of health of a vision-based lane sensing system. The vehicle system 10 analyzes a vision system used by the vehicle such as but not limited to, lane departure warning systems or lane centering systems, for determining whether any misalignment has occurred with respect to the vision system. The vehicle system 10 includes a vision-based capture device 12 for capturing images exterior of the vehicle. A processor 14 receives data obtained by the vision-based capture device 12 and analyzes the data for determining any substantial violations in the lane sensing system. The vision-based capture device 12 may be used to detect a vehicle heading θ, vehicle lateral offset y, an estimated curvature of an expected path of travel of the vehicle $C_Y$, a lane curvature of a traveled road $C_L$.

A yaw rate sensor 16 or similar device may be used to determine a yaw rate of the vehicle. A vehicle speed sensor 18 including by not limited to, wheel speed sensor, PCM, throttle sensor, accelerator pedal sensor, may be used to determine the speed of the vehicle. A buffer 20, preferably a circular buffer, may be used to store data including historical data that may be used for determining misalignments in the vision-based capture device 12.

The processor 14 analyzes data from various devices for determining whether a substantial error is present that indicates an anomaly in the vision-based lane sensing system. If the determination is made that the angle misalignment is not a substantial variation from a norm, then a calibration module can automatically calibrate parameters for correcting a minor misalignment via calibration module 22. The calibration module 22 can be a standalone unit or can be integrated as part of the processor or vision-based capture device. If a determination is made that a substantial variation from a norm is present, then a warning device 24 is actuated for notifying a driver of the fault and that the vehicle needs to be taken to a vehicle service station.

Figure 2:
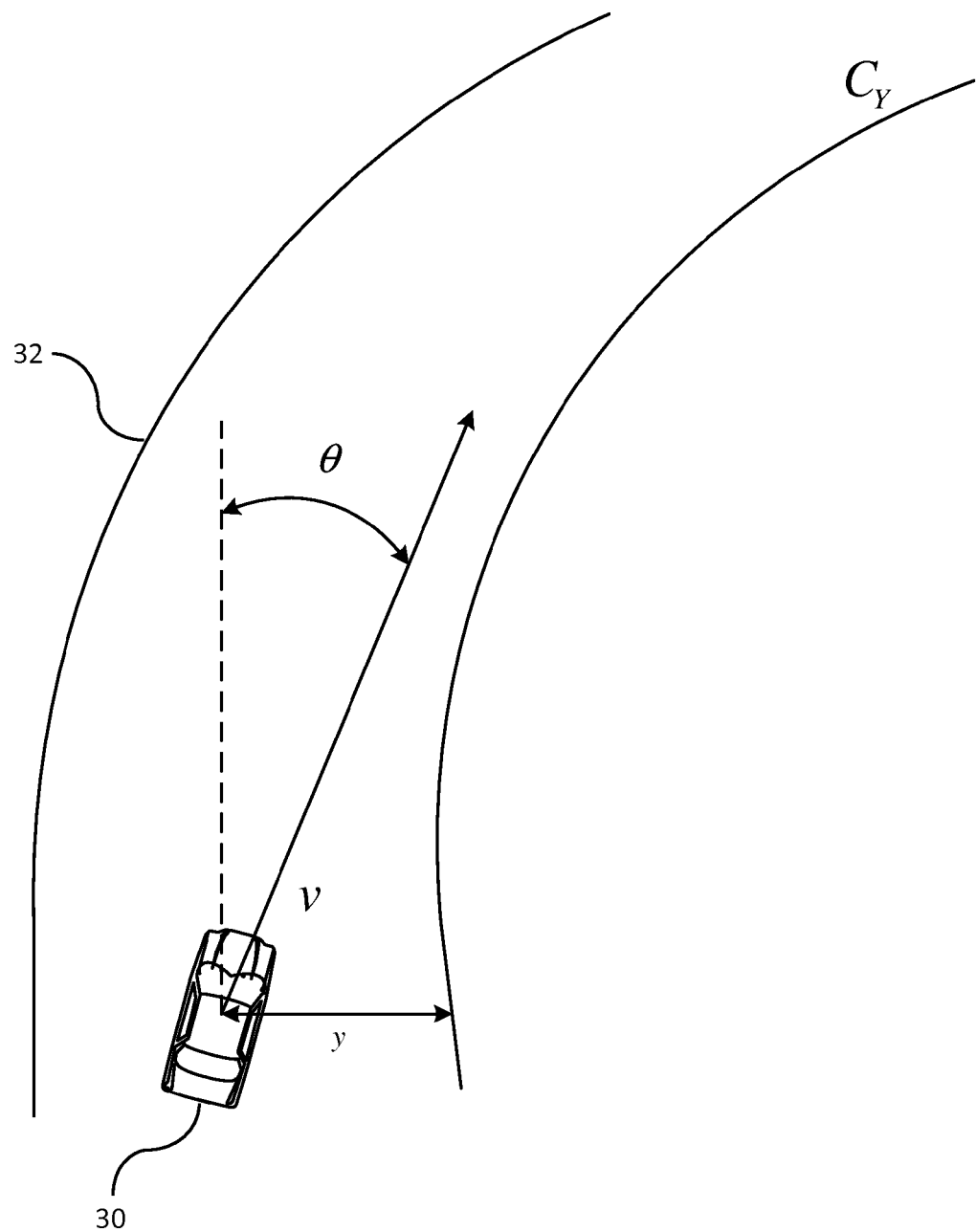
FIG. 2 is a graphic illustration showing a lateral offset and a vehicle heading.

FIG. 2 is a graphic illustration of a correlation between a lateral offset of a vehicle and a vehicle heading for detecting angle misalignment of the vision-based imaging device. The vehicle 30 is shown traveling along the road of travel 32 at a vehicle speed. A direction in which the vehicle 10 is driving is designated by a vehicle heading θ. A vehicle lateral offset y is shown and is the distance from the vehicle to the edge of the lane of the road of travel.

Figure 3:
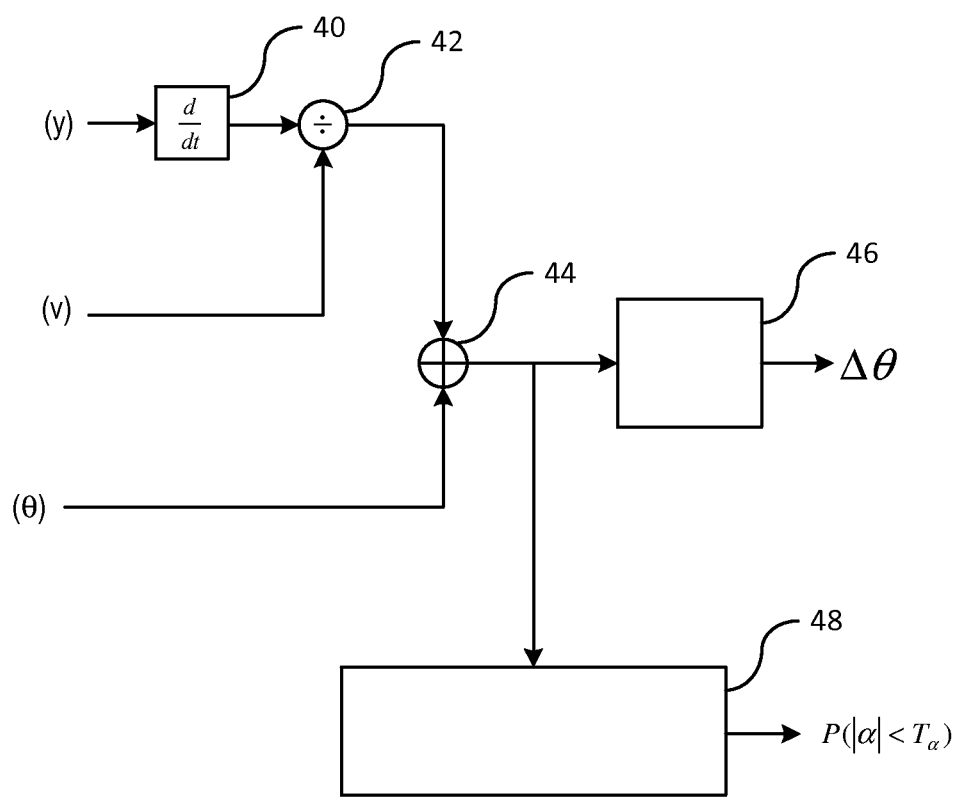
FIG. 3 is a block diagram of a mathematical function detecting angle misalignment as a function of lateral offset and vehicle heading.

In FIG. 3 illustrates a block diagram setting forth the mathematical function applied to the various input data for detecting angle measurement in the lane sensing system. The lateral offset y, the vehicle speed v, and vehicle heading θ are each applied as input parameters to the model. A derivative of the vehicle lateral offset y is obtained at block 40. The derivative of the vehicle lateral offset y and the host vehicle speed data v are applied as inputs to a division mathematical function 42 where vehicle lateral offset y is divided by the host vehicle speed data v. The mathematic model for the division function is represented as $$\frac{\dot{y}}{v_H}.$$

The result is then input to the subtraction mathematic function shown generally at 44. The mathematic model from the subtraction mathematic function is represented as $$\frac{\dot{y}}{v_H} - \theta.$$

In block 46, a heading measurement misalignment can be determined and is represented as a change in the vehicle heading with respect to the lane Δθ.

In block 48, a heading measurement misalignment is also applied to a distribution estimator where an abnormal detection statistic is analyzed for determining a substantial violation in the lane sensing system. This may be represented by the probability $P(|\alpha|<T_a)$ where $T_a$ is the distribution limit from the mean and $P|\alpha|$ represents the probability of whether angle misalignment is within the limits.

Figure 4:
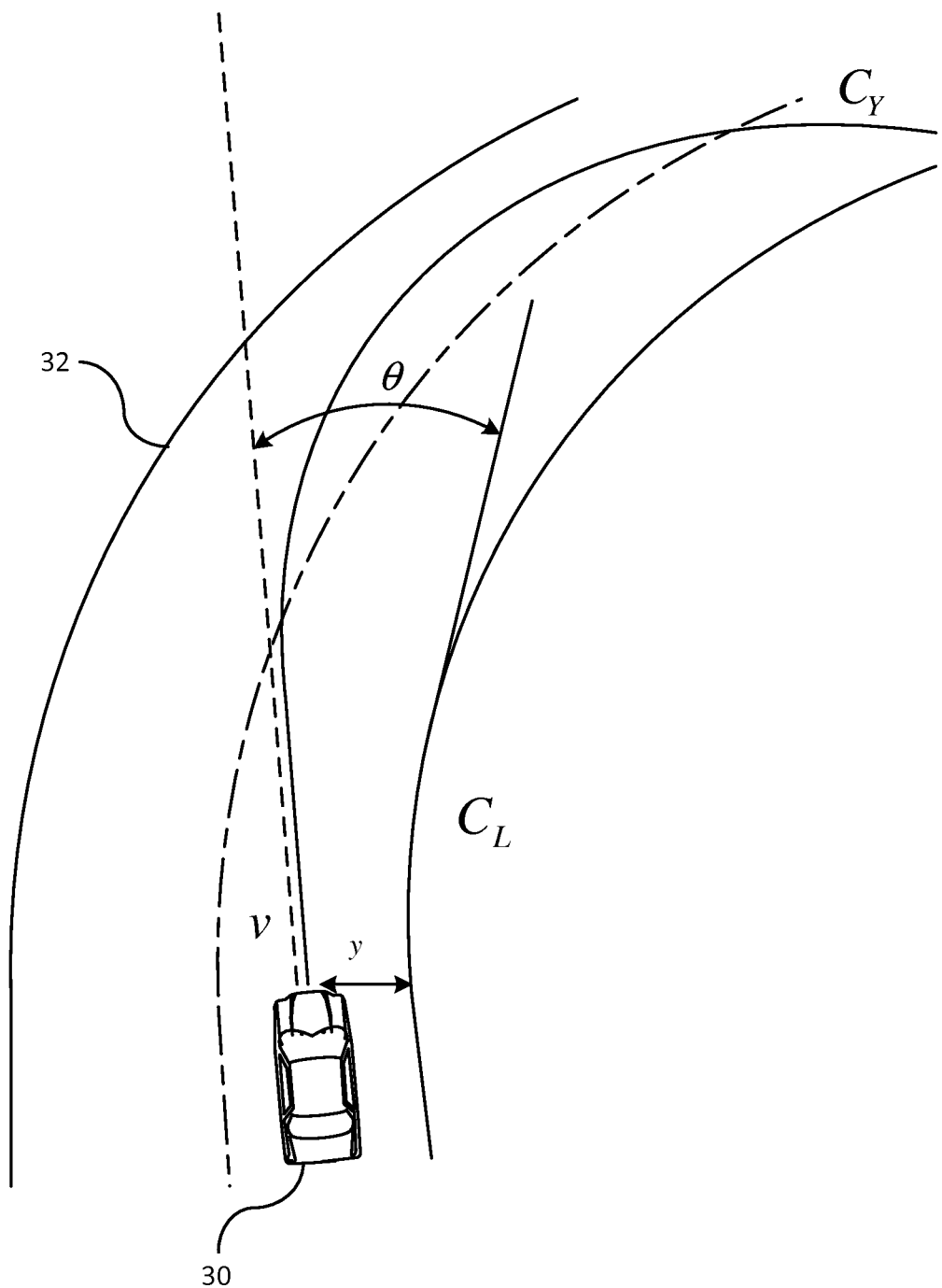
FIG. 4 is a graphic illustration showing an estimated route curvature, lane curvature, and a vehicle heading.

FIG. 4 is a graphic illustration of a correlation between vehicle heading, vehicle yaw rate, and lane curvature for detecting angle misalignment in the lane sensing system. The vehicle 30 is shown traveling along the road of travel 32 having a lane curvature $C_L$. The vehicle is traveling at a vehicle speed v with a vehicle heading θ. A vehicle lateral offset y is shown and is the distance from the vehicle to the edge of the lane of the road of travel.

Figure 5:
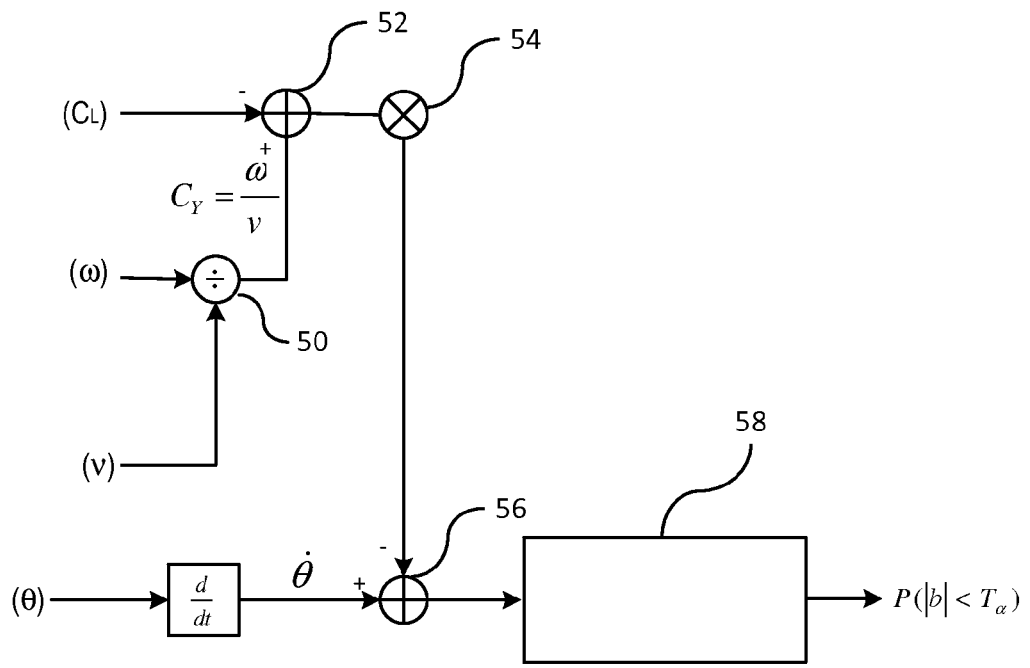
FIG. 5 is a block diagram of a mathematical function detecting angle misalignment as a function of lane curvature, yaw rate, and vehicle speed.

FIG. 5 illustrates a block diagram of the mathematical function applied to the various input data. The vehicle heading θ, the vehicle speed v, the yaw rate ω, and the lane curvature $C_L$ are each applied as input parameters to the model.

The vehicle yaw rate ω and the vehicle speed data v are applied as inputs to a division mathematical function 50 where yaw rate ω is divided by the host vehicle speed data v for generating an estimated curvature of an expected path of travel of the vehicle represented by $C_Y$. The mathematic model for the estimated curvature of an expected path of travel is represented as $$C_Y = \frac{\omega}{v}.$$

The result from block 50 along with the lane curvature $C_L$ is applied to a subtraction mathematic function shown generally at 52. The mathematic model for the difference mathematic function 52 is represented as $(C_Y-C_L)$.

At mathematical function 54 a product of the curvature differences $(C_Y-C_L)$ and the vehicle speed v is determined. The result of the product along with the derivative of the vehicle heading θ is then applied to a subtraction mathematical function 56. The resulting mathematic function is represented by the following formula:

$$\beta = \dot{\theta} - (C_Y - C_L)v_H$$

where $\dot{\theta}$ is a derivative of the vehicle heading with respect to a lane of travel, $C_Y$ is the estimated curvature of an expected path of travel of the vehicle, $C_L$ is the lane curvature of a traveled road, and v is the vehicle speed.

In block 58, a heading measurement misalignment is determined. A distribution estimator is applied for determining whether an abnormal detection statistic is present. This may be represented by the probability $P(|\beta|<T_\beta)$ where $T_\beta$ is a determined distribution limit from the mean and $P|\beta|$ represents the probability of whether angle misalignment is within the limits.

Figure 6:
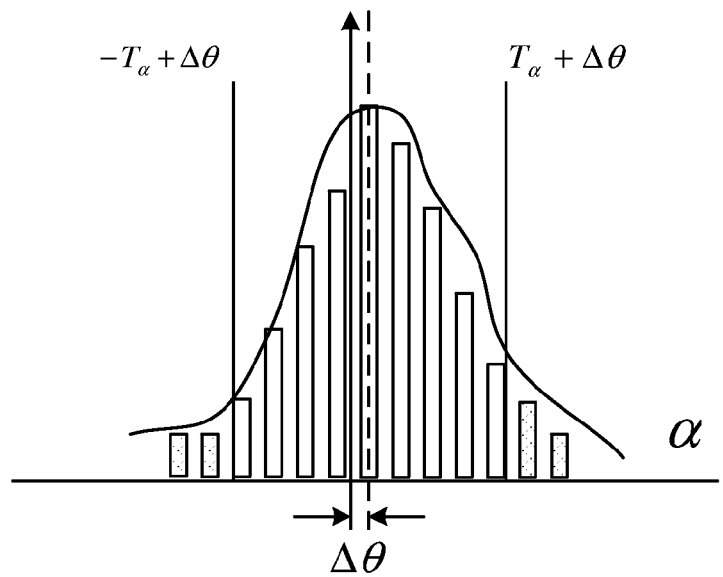
FIG. 6 is an exemplary histogram generated using determined misalignment data.

FIG. 6 represents a histogram generated for a respective set of data for determining whether the angle misalignment data is within a correctable limit. In FIG. 6, the horizontal axis represents the respective angle measurements whereas the vertical axis represents the number of counts for each respective angle. The limits (thresholds) are identified as $-T_a<\Delta\theta$ and $T_a+\Delta\theta$ where $T_a$ represents the distribution limits and Δθ represents the angle misalignment offset from the mean of the data of the histogram. Based on the histogram, the probabilities $P|\alpha|$ and $P|\beta|$ can be determined.

Figure 7:
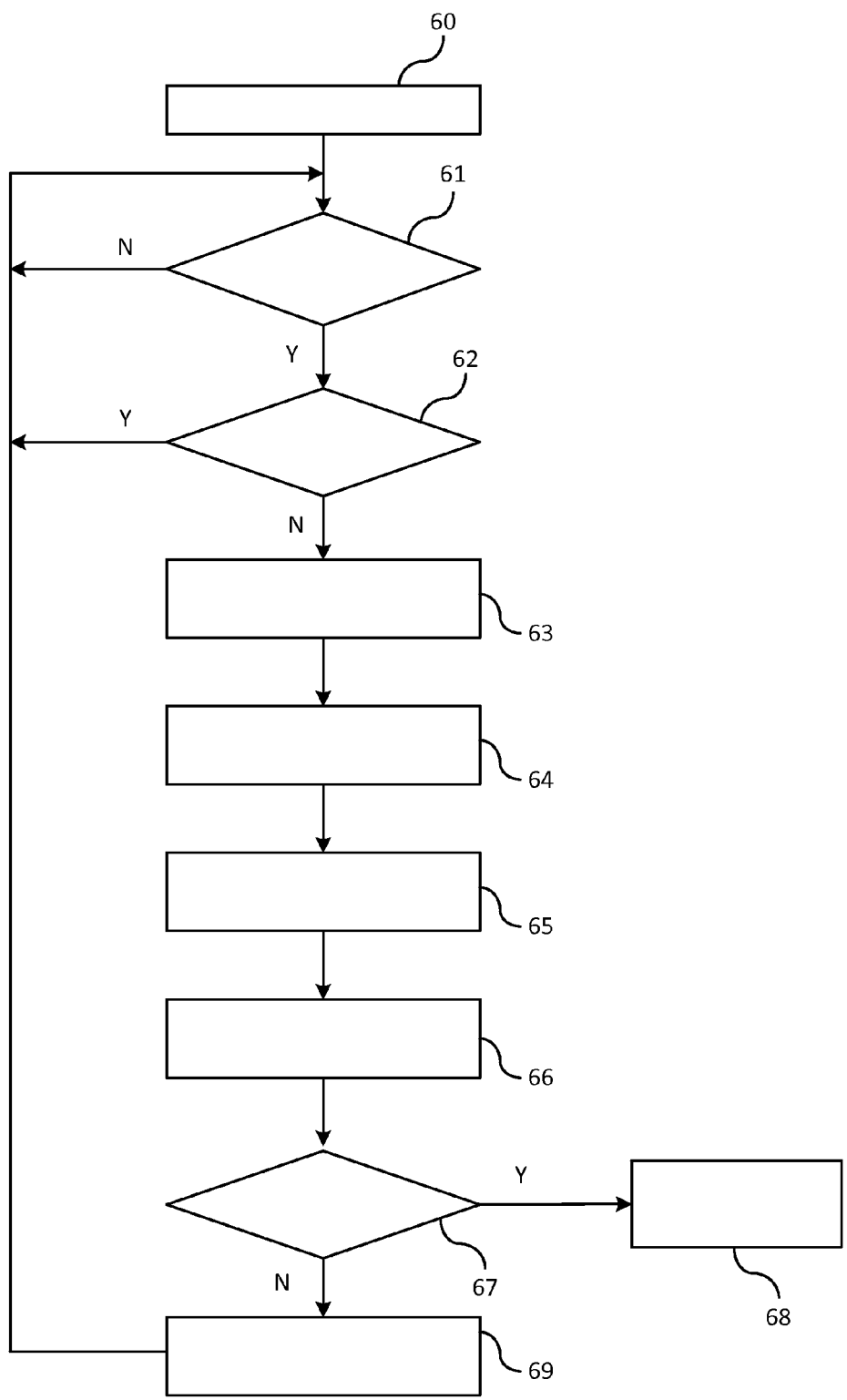
FIG. 7 is a flow diagram for determining an angle misalignment in the lane sensing system

FIG. 7 illustrates a flow diagram for determining an angle misalignment in the lane sensing system.

In block 60, the routine is initiated. In block 61, a determination is made as to whether new sensor data is obtained. If new sensor data is obtained, the routine proceeds to block 62; otherwise, the routine waits for new data.

In block 62, a determination is made as to whether a lane-cross event is detected. A lane-cross event may be determined by monitoring the vehicle speed for determining whether the speed is greater than a predetermined speed, whether the turn signal is not actuated, and whether no lane-cross event has occurred within a predetermined amount of time, by the vision lane sensing system.

If a determination is made that an intended lane change is occurring, the routine returns to step 61 to await new sensor data. If an unintended lane change is occurring, then the routine proceeds to step 63.

In step 63, the deviation in the vision misalignment is determined. If the vision sensors are properly aligned, then $$\frac{\dot{y}}{v_H} = \theta$$

and $\dot{\theta} = (C_Y - C_L)v_H$. If the comparisons are not equal, then the first misalignment factor is determined by $$\alpha = \frac{\dot{y}}{v_H} - \theta.$$

and the second misalignment factor is determined by $\beta = \dot{\theta} - (C_Y - C_L)v_H$.

In block 64, histograms are recursively estimated for α and β.

In block 65, the probability is determined of whether each set of data is within a misalignment threshold. The probabilities are represented by $P(|\alpha|<T_\alpha)$ and $P(|\beta|<T_\beta)$.

In block 66, a probability for a state of health of the vision lane sensing system is determined. The probability for the state of health may be determined by the formula:

$$P(SOH)=P(|\alpha|<T_\alpha)P(|\beta|<T_\beta)$$

In block 67, a determination is made as to whether the SOH is less than a predetermined SOH threshold (e.g., 0.8). If a determination is made that the probability for the SOH is less than the predetermined threshold, then the routine proceeds to block 68 where a fault is actuated to a driver of the vehicle indicating a faulty lane sensing system; otherwise the routine proceeds to block 69. A SOH implies that the larger probability is, the higher likelihood that the sensors are properly aligned with only minor alignment required. Therefore, when SOH is less than a threshold, a sensing system fault will be reported.

In block 69, a misalignment estimation $\Delta\theta$ is determined. The misalignment estimation is utilized to correct the angle misalignment by the vehicle. The routine then proceeds to block 61 and awaits a next set of data.

While certain embodiments of the present invention have been described in detail, those familiar with the art to which this invention relates will recognize various alternative designs and embodiments for practicing the invention as defined by the following claims.

What is claimed is:

1. A method of diagnosing a state of health of a vision-based lane sensing system for a vehicle, the method comprising the steps of:
   calculating a first misalignment factor as a function of a vehicle lateral offset and a vehicle heading;
   calculating a second misalignment factor as a function of a vehicle speed, an estimated curvature of an expected path of travel of the vehicle, a lane curvature of a traveled road, and the vehicle heading;
   generating a histogram for the first misalignment factor and a histogram for the second misalignment factor;
   determining a probability of a state of health based on the histogram of first misalignment factor and the histogram of the second misalignment factor;
   determining whether the probability of the state of health is within a predetermined threshold; and
   estimating an angle misalignment of the vision system;
   correcting the angle misalignment of the vision system in response to the determination that the probability of the state of health is within the predetermined threshold; otherwise actuating a warning of a faulty lane sensing system.

2. The method of claim 1 wherein determining the probability of a state of health comprises the following steps:
   determining a probability of the first misalignment factor;
   determining whether the probability of the first misalignment factor is less than a first distribution threshold;
   determining a probability of the second misalignment factor;
   determining whether the probability of the second misalignment factor is less than a second distribution threshold;
   determining the probability of the state of health as a function of the probability of the first misalignment factor being less than the first distribution threshold and the probability of the second misalignment factor being less than the second distribution threshold.

3. The method of claim 1 wherein the first misalignment factor is determining by the following formula:

$$\alpha = \frac{\dot{y}}{v_H} - \theta$$

where $\dot{y}$ is a derivative of the vehicle lateral offset, $v_H$ the vehicle speed, and $\theta$ is the vehicle heading with respect to a lane of travel.

4. The method of claim 3 wherein the first misalignment factor substantially equal to zero indicates no angle misalignment of the vision system.

5. The method of claim 3 wherein the second misalignment factor is determined by the following formula:

$$\beta = \dot{\theta} - (C_Y - C_L)v_H$$

where $\dot{\theta}$ is a derivative of the vehicle heading with respect to a lane of travel, $C_Y$ is the estimated curvature of an expected path of travel of the vehicle, $C_L$ is the lane curvature of a traveled road, and $v_H$ is the vehicle speed.

6. The method of claim 5 wherein the first misalignment factor and the second misalignment factor are stored in a buffer.

7. The method of claim 5 wherein the second misalignment factor substantially equal to zero indicates no angle misalignment of the vision system.

8. The method of claim 5 further comprising the steps of recursively estimating respective histograms for the first misalignment factor and the second misalignment factor.

9. The method of claim 1 wherein determining whether the probability of the state of health is within a predetermined threshold includes determining whether the probability state of the state of health is within 0.8.

10. The method of claim 1 further comprising the steps of:
    obtaining new sensor data in response to correcting the angle misalignment of the vision system.

11. The method of claim 1 wherein the first misalignment factor and the second misalignment factor is determined only in response to a determination of an unintended lane change movement.

12. The method of claim 11 wherein the unintended lane change movement is determined by a factor of at least the vehicle speed being greater than a predetermined speed.

13. The method of claim 11 wherein the unintended lane change movement is determined by a factor of at least a turn signal not being actuated.

14. The method of claim 9 wherein the unintended lane change movement is determined by a factor of at least detecting no lane crossing within a predetermined amount of time.

* * * * *